United States Patent [19]

Singer, III et al.

[11] Patent Number: 5,520,416

[45] Date of Patent: May 28, 1996

[54] POWER TILT, TELESCOPING AND INTERNALLY COLLAPSIBLE STEERING COLUMN

[75] Inventors: John C. Singer, III, Plymouth; Clarke F. Thacker, Farmington Hills; Luigi Mastrofrancesco, Livonia; Nancy J. Cragel, Northville, all of Mich.

[73] Assignee: Ford Motor Company, Dearborn, Mich.

[21] Appl. No.: 316,961

[22] Filed: Oct. 3, 1994

[51] Int. Cl.$^6$ .............................. B62D 1/18; B62D 1/19
[52] U.S. Cl. .............................. 280/775; 280/777; 74/493; 74/89.15
[58] Field of Search .................................. 280/775, 777; 74/493, 89.15, 492

[56] References Cited

U.S. PATENT DOCUMENTS

| Re. 34,359 | 8/1993 | Matsumoto et al. | 74/493 |
|---|---|---|---|
| 4,527,444 | 7/1985 | McKee et al. | 74/493 |
| 4,612,822 | 9/1986 | Nishikawa et al. | 74/493 |
| 4,741,165 | 5/1988 | Kobus | 74/89.15 |
| 4,752,085 | 6/1988 | Yamamoto | 280/775 |
| 4,796,481 | 1/1989 | Nolte | 74/493 |
| 4,878,394 | 11/1989 | Nakamura et al. | 74/493 |
| 4,893,518 | 1/1990 | Matsumoto et al. | 74/493 |
| 4,900,059 | 2/1990 | Kinoshita et al. | 280/775 |
| 4,901,592 | 2/1990 | Ito et al. | 280/777 |
| 4,901,593 | 2/1990 | Ishikawa | 74/493 |
| 5,035,446 | 7/1991 | Arvidsson | 280/775 |
| 5,048,364 | 9/1991 | Minamoto et al. | 74/493 |
| 5,163,337 | 11/1992 | Herron et al. | 74/493 |
| 5,178,411 | 1/1993 | Fevre et al. | 280/775 |
| 5,209,135 | 5/1993 | Ichikawa | 280/777 |
| 5,222,402 | 6/1993 | White et al. | 74/89.15 |

FOREIGN PATENT DOCUMENTS

3737164  5/1989  Germany .................. 280/775

*Primary Examiner*—Richard M. Camby
*Assistant Examiner*—Peter C. English
*Attorney, Agent, or Firm*—Raymond L. Coppiellie; Roger L. May

[57] ABSTRACT

A power tilt, telescoping and internally collapsible steering column assembly is provided. The assembly comprises a main housing, a telescope housing, and a tilt head. The telescope housing and tilt head are driven by a pair of torsionally rigid axially flexible cables extending generally along the steering column. The cable is adapted by its axial flexibility to axially flex to accommodate the collapse of the telescope housing with respect to the main housing.

10 Claims, 6 Drawing Sheets

POWER TILT, TELESCOPING AND INTERNALLY COLLAPSIBLE STEERING COLUMN

TECHNICAL FIELD

This invention relates to vehicle steering columns, and more particularly steering columns with tilt and telescoping functions.

BACKGROUND ART

A variety of tilting and telescope traveling steering column arrangements have been developed in the field of automotive vehicles. In such a tilting and telescope traveling steering column arrangement, the telescope traveling mechanism is usually arranged as follows: a part of a steering shaft on which a steering wheel is mounted is axially slidably fitted in a fixed tube fastened to a movable bracket, in which the splines of the part of the steering shaft are in engagement with the splines of the fixed tube. This allows the steering shaft to axially move relative to the fixed tube. The steering shaft is coaxially fitted with a telescopic upper jacket which is coaxially fitted in a telescopic lower jacket fixed to the movable bracket. The telescopic upper jacket is formed with a threaded portion which is engaged with a threaded portion of a telescopic sleeve. The telescopic sleeve is rotated around its axis by an electric motor, thus axially displacing the steering shaft.

However, telescope motions of the steering shaft are accomplished under engagement of external and internal threads, in which the external and internal threads displace axially relative to each other upon rotation. Since such engagement of the external and internal threads are considerably high in frictional resistance, a relatively large force is required to axially displace the steering shaft. Accordingly, the electric motor is required to have a high output capacity and therefore becomes high in cost. As a result, an electrically operated telescope traveling mechanism is costly and difficult to implement.

Tilting functions are also commonplace. Many configurations are available in the prior art for steering column tilt mechanisms. However, many of the prior art systems are cumbersome and bulky, thus resulting in packaging and cost problems. Also, these designs do not easily lend themselves to steering column collapse designs for a vehicle crash situation. Some common collapsible steering column shaft assemblies are disclosed in U.S. Pat. Nos. 3,492,888, 3,656,366, and 4,183,258.

Another important steering column design consideration is to provide for energy absorption at impact in the steering column. One such energy absorption means is provided by the absorption bracket disclosed in U.S. Pat. No. 3,600,971. However, this energy absorbing bracket does not allow the steering column assembly to collapse upon itself, nor is it functional with a tilt or telescope arrangement.

It would be desirable to provide a tilting and telescoping steering column assembly which has energy absorption means, and is internally collapsible.

It would be further desirable to provide a tilting and telescoping assembly with position sensors to provide means for memory of desired steering wheel positions for different drivers.

DISCLOSURE OF INVENTION

A steering column assembly is provided comprising: a main housing; a telescoping assembly, including a telescope housing slidably connected to the main housing, a first motor connected to the main housing, a first torsionally rigid axially flexible cable rotatably driven by the first motor, a telescope actuator operatively connected between the main housing and the telescope housing and driven by the first cable for reciprocating the telescope housing with respect to the main housing; and a tilt assembly, including a tilting head pivotally connected to the telescope housing for carrying a steering wheel, a second motor connected to the main housing, a second torsionally rigid axially flexible cable rotatably driven by the second motor, a tilt actuator operatively connected between the tilting head and the telescope housing and driven by the second cable for tilting the steering wheel with respect to a user; and said axial flexibility of said first and second cables accommodating collapse of said telescope housing with respect to said main housing.

Another aspect of the invention provides a drive member for a vehicle steering column assembly having an actuator for tilting the steering wheel, the drive member comprising a torsionally rigid axially flexible cable extending generally along the steering column for rotatably driving the actuator.

A further aspect of the present invention provides a sub-combination for use in a telescoping steering wheel assembly having portions telescopically movable with respect to each other comprising a torsionally rigid axially flexible cable having one end adapted for connection between the portions for moving the portions respectively telescopically, said cable being adapted by its axial flexibility to axially flex to accommodate the telescopic movement of the portions with respect to each other when the portions are not being telescopically moved by the one end of the cable.

A still further aspect of the present invention provides a steering apparatus, comprising: a first portion adapted to be fixed to a vehicle body and having a main housing provided thereon; a second portion telescopically movable with respect to the main housing, a second portion having first and second ends thereof; a third portion including a pivot assembly pivotally connecting the third portion with respect to the second portion and adapted to receive a steering wheel thereon; a pivot actuator operatively connected to the pivot assembly for pivoting the third portion with respect to the second portion; a telescope actuator operatively connected between the first and second portions for telescoping the second portion with respect to the first portion; a first motor stationary with respect to the first portion for driving the telescope actuator; a first driver driven by the first motor; a first torsionally rigid axially flexible cable having a first end rotatably driven by the first driver and relatively shiftable axially with respect to the first driver and a second end connected to the telescope actuator, such that rotation of the first end of the first cable by the first driver is translated by the first cable to drive the telescope actuator and the first cable is axially flexed as the second portion moves with respect to the first portion; a second motor stationary with respect to the first portion for driving the pivot actuator; a second driver driven by the second motor; and a second torsionally rigid axially flexible cable having a first end rotatably driven by the second driver and relatively shiftable axially with respect to the second driver and a second end connected to the pivot actuator, such that rotation of the first end of the second cable by the second driver is translated by the second cable to drive the pivot actuator and the second cable is axially flexed as the second portion moves with respect to the first portion.

Accordingly, an object of the present invention is to provide a tilting and telescoping steering column apparatus.

A further object of the present invention is to provide a tilting and telescoping steering apparatus which is internally collapsible in order to allow collapse upon impact in a crash situation.

A still further object of the present invention is to provide a collapsible drive member extending from a motor to an actuator in a steering column assembly.

Yet another object of the present invention is to provide means for absorption of energy of impact at a steering wheel in a crash situation.

A further object of the present invention is to provide a position sensor for a tilting and telescoping steering column which senses and remembers the position of the steering wheel with-respect to different drivers.

DETAILED DESCRIPTION OF THE PREFERRED EMBODIMENT

Figures 1, 1A:
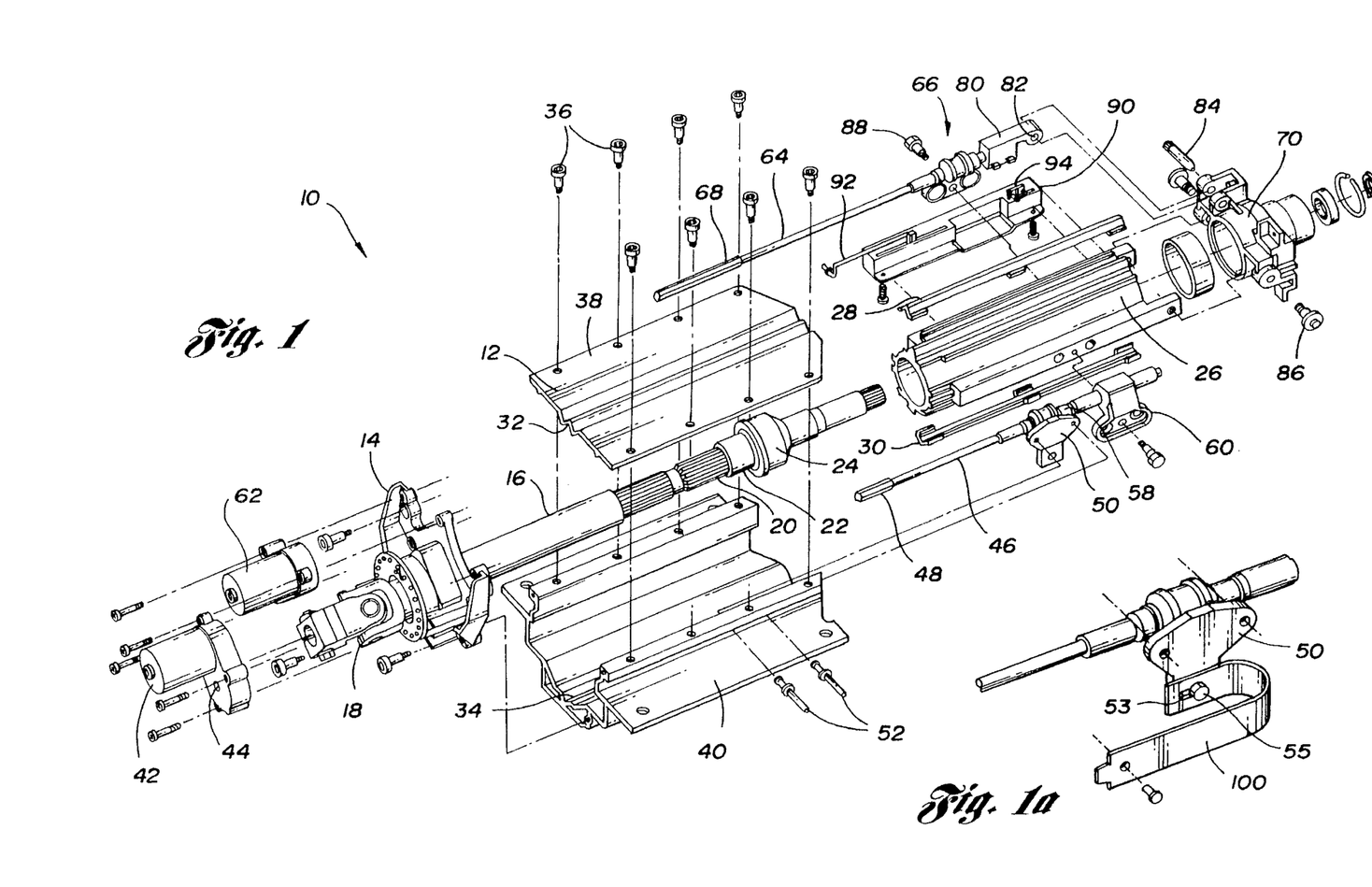
FIG. 1 shows an exploded perspective view of a steering column assembly according to the present invention.
FIG. 1a is a perspective view of a curl strap and first thrust bearing unit in accordance with a further embodiment of the present invention.

Referring to FIG. 1, a steering column assembly 10 is provided. A main housing 12 is connected to the lower bearing retainer 14, and encapsulates the lower steering column shaft 16. The lower shaft 16 is connected to a U-joint 18, which is connected to an intermediate shaft leading to the vehicle steering gear input shaft. The lower shaft 16 is internally splined in order to receive the central shaft 20. The upper shaft 22 is also internally splined to receive the other end of the central shaft 20. The upper and central shafts move with respect to the lower shaft 16 along a common axis as the steering column telescopes in and out. Furthermore, the lower shaft is capable of collapsing over the central shaft a distance of four inches as a result of the large gap between the upper and lower shafts 16,22. In this manner, in a vehicle crash situation, the steering column shaft is able to collapse a distance of four inches upon driver impact with the steering wheel, plus or minus the telescope movement of the upper shaft 22 with respect to tile lower shaft. A large portion of the lower shaft 16 is not internally splined in order to avoid binding in a crash situation. The upper tilt shaft 24 includes a universal joint therein to universally connect the upper shaft 22 with respect to the steering wheel.

The upper and lower shafts 16,22 pass through a central axial opening in the telescope housing 26. The telescope housing 26 moves in and out with respect to the main housing 12. The plastic tracks 28,30 guide movement of the telescope housing 26 with respect to the main housing 12. The plastic tracks 28,30 are connected to the telescope housing 26 and ride in the V-grooves 32,34 in the main housing 12. The upper portion 38 of the main housing is screwed to the lower portion 40 of the main housing by means of the support screws 36. The support screws 36 hold the upper portion 38 of the main housing in a bent position over the top of the plastic track 28 in order to provide a preload upon the plastic track.

A first electric motor 42 is connected to the lower bearing retainer 14. The first motor 42 has a first transmission gear having an aperture 44 formed therethrough for receiving an end of a first cable 46. The first cable 46 is formed of wound steel wire. The cable 46 is torsionally rigid yet axially collapsible. The first cable 46 has a first hex head 48 mounted thereon for being slidably received within the first aperture 44. As the telescope housing 26 moves in and out with respect to the main housing, the hex head 48 is generally fixed with respect to the aperture 44. This is unlike the hex head 68 which is free to travel in and out along with the telescope housing 26. However, the hex head 48 will no longer be fixed with respect to the first aperture 44 in a vehicle crash situation. In a crash situation, the first cable 46 will collapse axially and move through aperture 44 in order to allow the telescope housing 26 to move with respect to the main housing 12, and the lower and upper shafts 16,22 converge about the central shaft 20 in order to allow a four inch collapse of the overall steering column assembly.

A first thrust bearing unit 50 is provided to receive the first cable 46 and to axially support a load on the cable. In one embodiment, the first thrust bearing unit 50 is connected to the main housing 12 by means of a pair of rivets 52. In a vehicle crash situation, the axial load placed upon the steering column by the driver will cause the telescope housing 26 to move toward the main housing, which will shear the rivets 52, thus allowing the telescope housing to travel further inward with respect to the main housing 12.

Figure 2:
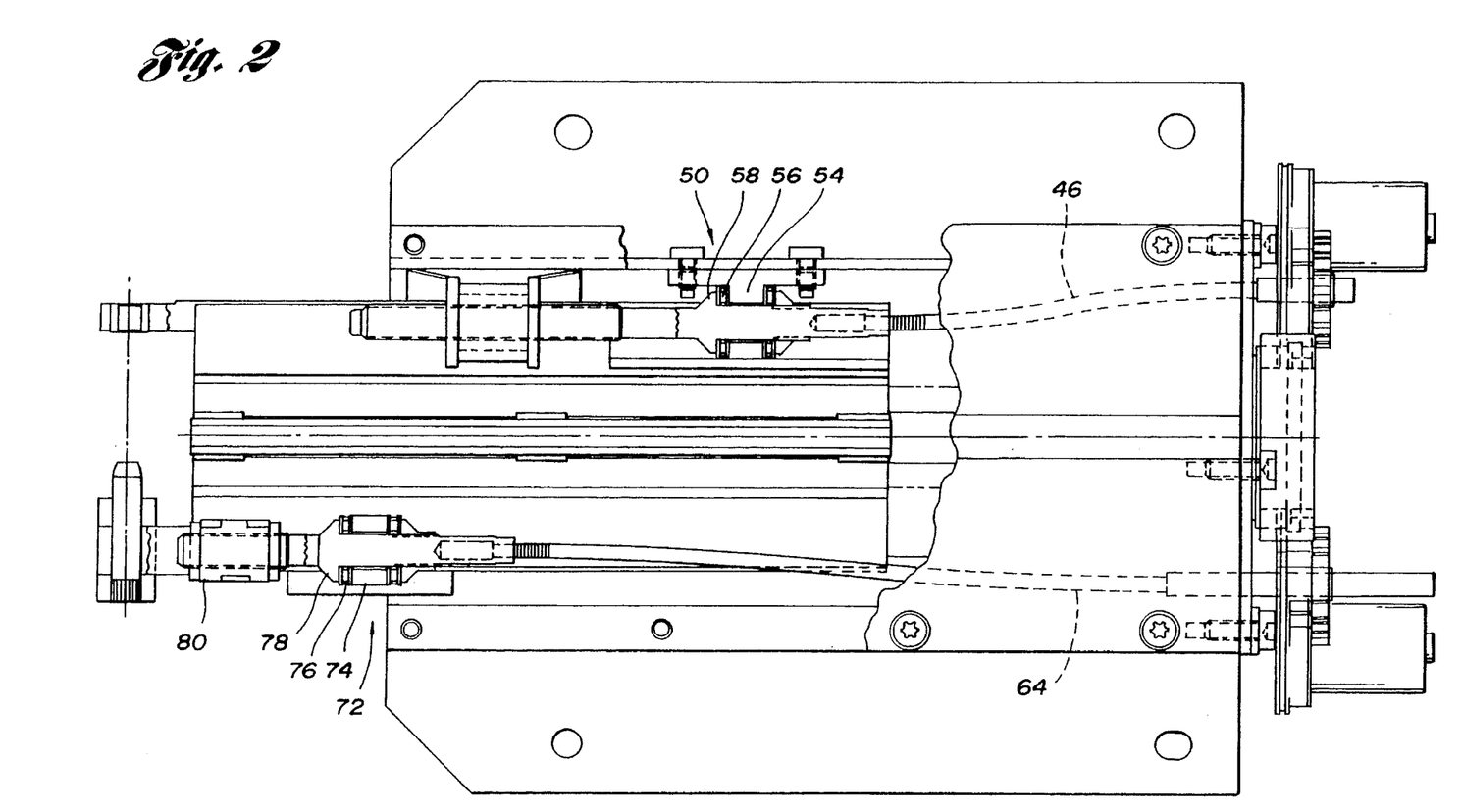
FIG. 2 shows a horizontal cross-section of a steering column assembly according to the present invention.
Figure 2A:
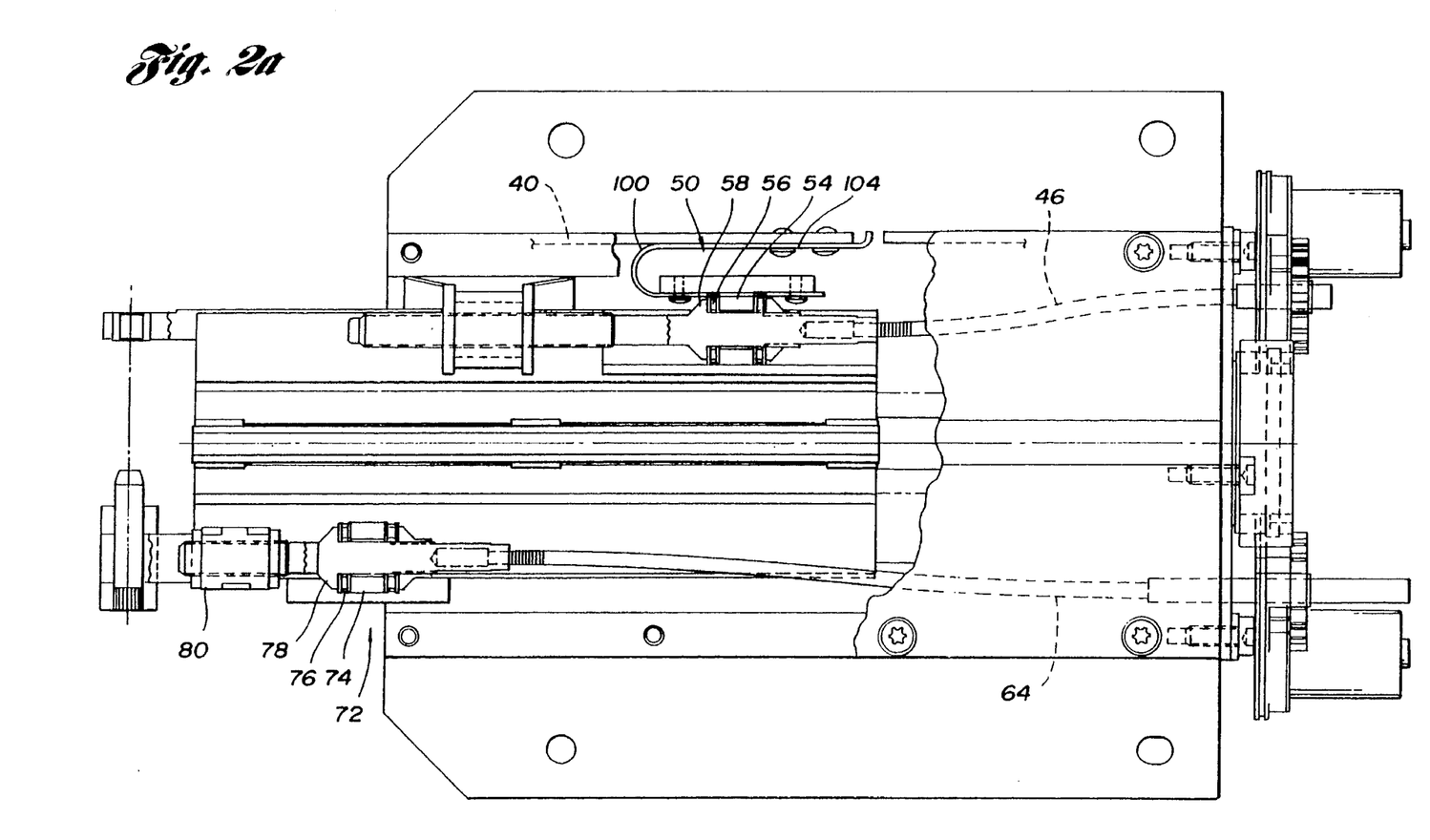
FIG. 2a shows a horizontal cross-section of a steering column assembly according to a further embodiment of the present invention.

Referring to FIG. 2, the first thrust bearing unit 50 includes a stationary thrust member 54, thrust bearings 56, and first cable end piece 58. As the first cable 46 rotates the first cable end piece 58, the thrust bearings 56 provide a rotational support between the first cable end piece 58 and the thrust member 54. The thrust member 54 remains stationary and bears any axial load on the first cable end piece 58.

Referring back to FIG. 1, a telescope actuator 60 is threadedly fastened to the first cable end piece 58. The telescope actuator 60 is mounted to the telescope housing 26. In operation, the first motor 42 turns the first hex head 48 which rotates the first cable 46. Rotation of the first cable 46 causes rotation of the first cable end piece 58 which moves the actuator 60 by means of the threaded connection therebetween. The first thrust bearing unit 50 supports an axial load on the first cable end piece 58. This load support provides means for movement of the telescope housing 26 in and out with respect to the main housing 12.

A similar mechanism is used to actuate the steering column tilt. A second motor 62 is connected to the lower bearing retainer 14 for driving the tilt mechanism. This motor is preferably a servomotor, but a stepper motor would function similarly. A second cable 64 extends from the second motor 62 to the second actuator 66. A second hex head 68 is connected to an end of the second cable 64 and extends into a second aperture formed in a second transmission gear in the second servomotor 62. The second motor 62 rotates the second hex head 68, which rotates the second cable 64. This rotation is translated through the second actuator 66 to move the tilt head 70.

Referring again to FIG. 2, a second thrust bearing unit 72 is shown. The second thrust bearing unit 72 includes a second stationary thrust member 74 which is mounted to the telescope housing 26 and supports an axial load on the second cable 64. The second set of thrust bearings 76 allow for rotational movement of the second cable end piece 78 with respect to the second stationary thrust member 74.

The second cable end piece 78 has a threaded extension which extends into and threadedly engages the internally threaded clevis 80. Rotation of the threads causes the clevis to move with respect to the second thrust bearing unit 72. The clevis 80 includes a clevis aperture 82 which receives the clevis pin 84. Movement of the clevis causes the clevis pin 84 to move with respect to the pivot screw 86, thus causing the tilt head 70 to pivot about the pivot screw 86 in order to tilt the steering wheel with respect to the driver.

Movement of the clevis 80 with respect to the second thrust bearing unit 72 includes a slight lateral movement along with the translational movement as a result of the pivoting movement of the clevis pin 84 with respect to the pivot screw 86. Accordingly, the second stationary thrust member 74 must be allowed to rock slightly in order to provide for this slight lateral movement of the clevis 80. This is accomplished by means of a single thrust screw 88 which attaches the second stationary thrust member 74 to the telescope housing 26. The second stationary thrust member 74 is allowed to rock about the thrust screw 88 as the clevis 80 follows movement of the clevis pin 84.

In a crash situation, the rivets 52 will shear, thus allowing the telescope housing 26 to move inward with respect to the main housing 12. The telescope housing 26 will move four inches from the point at which the rivets shear until the telescope housing bottoms out in the bottom of the lower bearing retainer 14. This four inch distance will vary depending upon the telescoping position of the steering wheel. Similarly, in a crash situation, the upper shaft 22 will collapse with respect to the lower shaft 16 a distance of four inches.

Figure 1B:
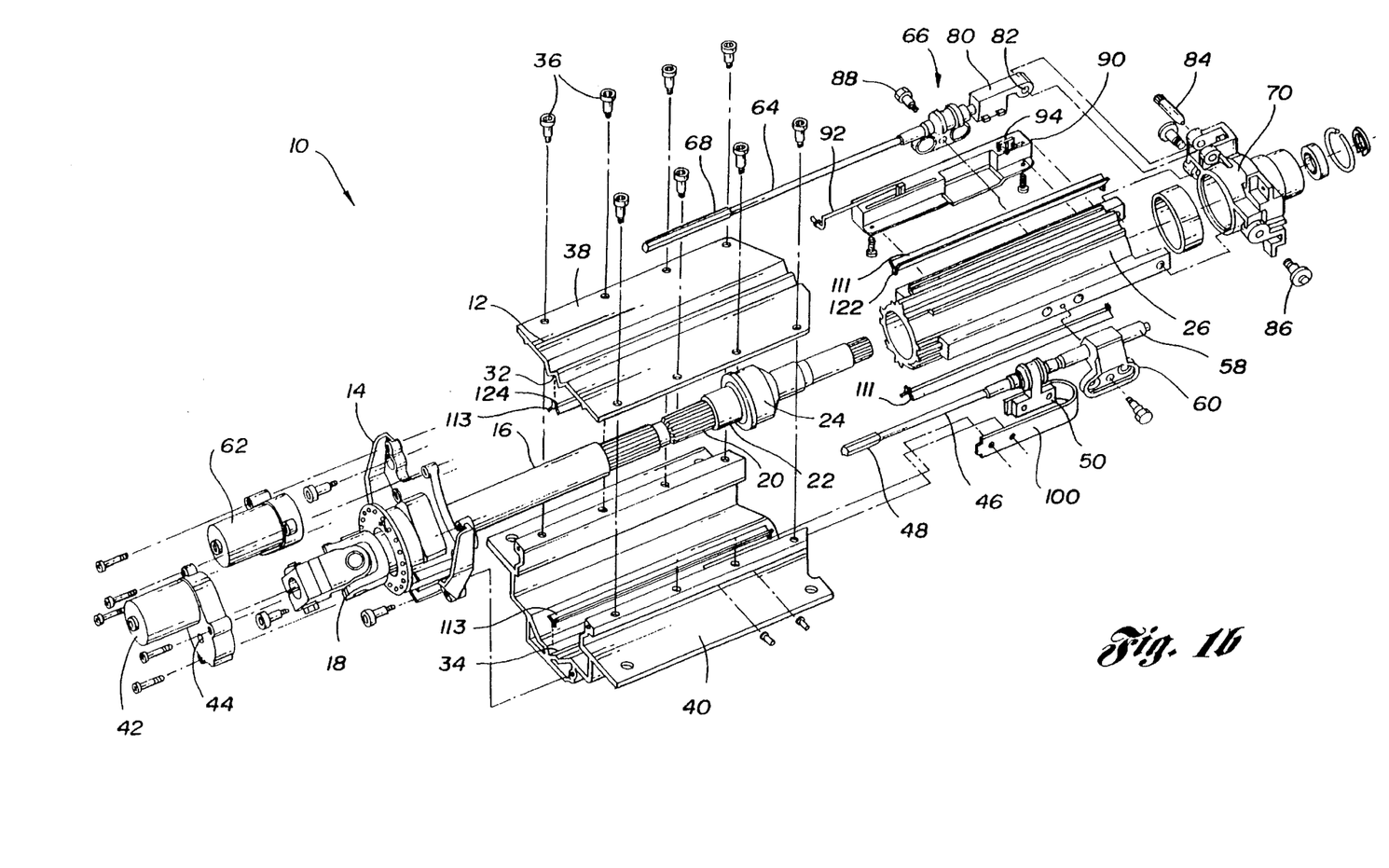
FIG. 1b shows an exploded perspective view of a steering column assembly according to yet another embodiment of the present invention.
Figure 3:
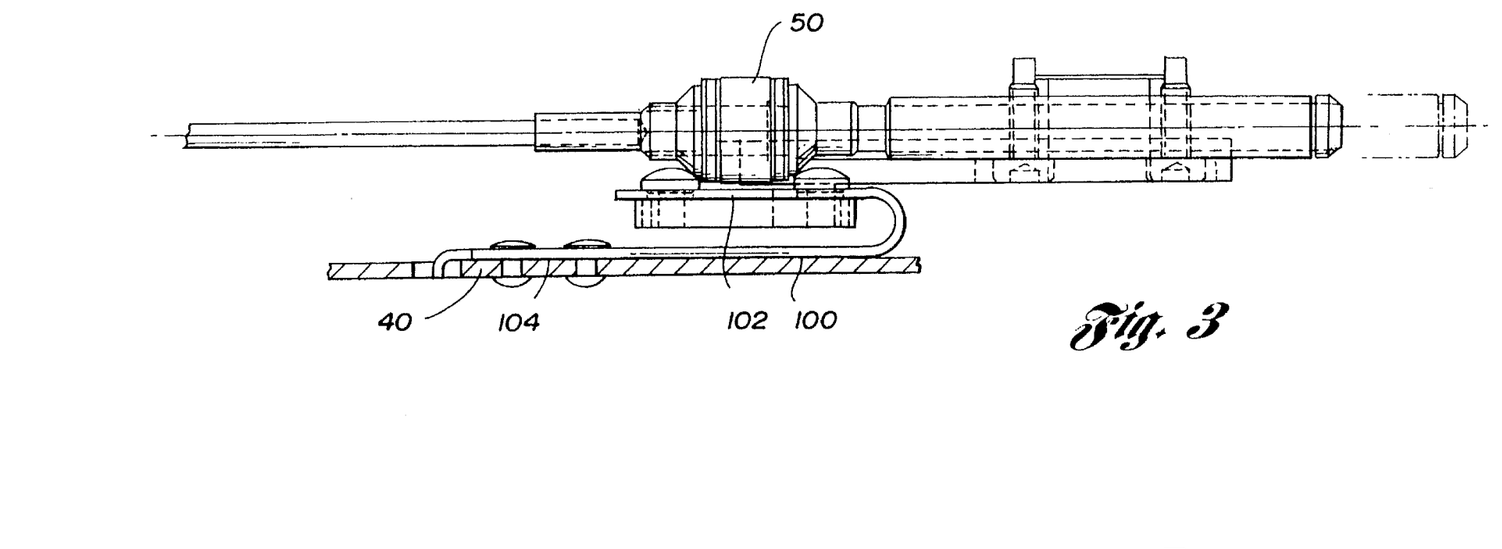
FIG. 3 shows a partial side view of a curl strap and actuator according to the present invention, the curl strap being in the pre-stroke position.
Figure 4:
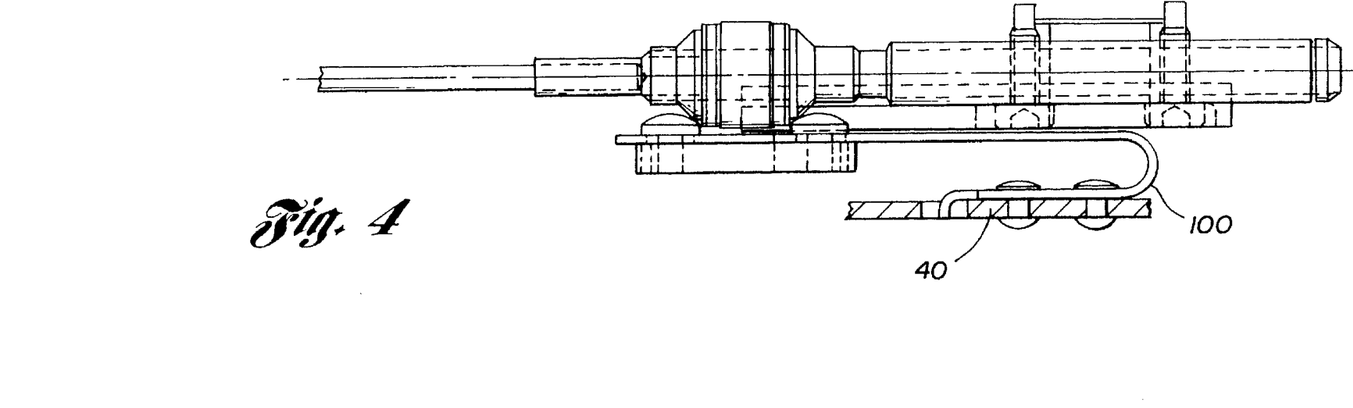
FIG. 4 shows a partial side view of a curl strap and actuator according to the present invention, the curl strap being in the fully stroked position.

The problem with this design is that the rivets will shear and an energy spike will occur. Ideally, energy absorption should be more steadily controlled. Accordingly, as shown in FIG. 1a, an alternative embodiment provides an energy absorbing curl strap 100 connected to the main housing 12. In a crash situation, the rivets 52 will shear, and the slot 53 will allow movement of the first thrust bearing unit 50 with respect to the curl strap 100. When the bolt 55 reaches the end of the slot 53, the curl strap 100 begins to absorb energy of movement of the telescope housing with respect to the main housing. Another embodiment of this curl strap assembly is shown in FIG. 1b, and correspondingly shown in FIGS. 3 and 4. In this embodiment, the curl strap 100 is connected directly to the first thrust bearing unit 50 by means of non-shearing bolts. In a crash situation, the bolts do not shear, and energy is simply absorbed by the curl strap 100 in a ramped absorption manner. Referring to FIGS. 3 and 4, the first end 102 of the curl strap 100 is connected to the first thrust bearing unit 50. The second end 104 of the curl strap 100 is connected to the main housing 12. In a crash situation, the telescope housing 26 will move inward with respect to the main housing 12. The curl strap 100 will curl in response to the energy of the driver impacting the steering wheel. FIG. 4 shows the curl strap 100 in a fully stroked position after crash. In this manner, the curl strap 100 may be manufactured to absorb energy in a desired manner. The energy absorption curve could be stepped, ramped, flat, or any other desired configuration.

Referring back to FIG. 1, a position sensor 90 is provided. Sensor arms 92,94 provide means for monitoring the tilt and telescope position of the steering wheel. In this manner, the position sensor 90 may be used to facilitate memory functions specifying desired steering wheel positions for different drivers.

Figure 5:
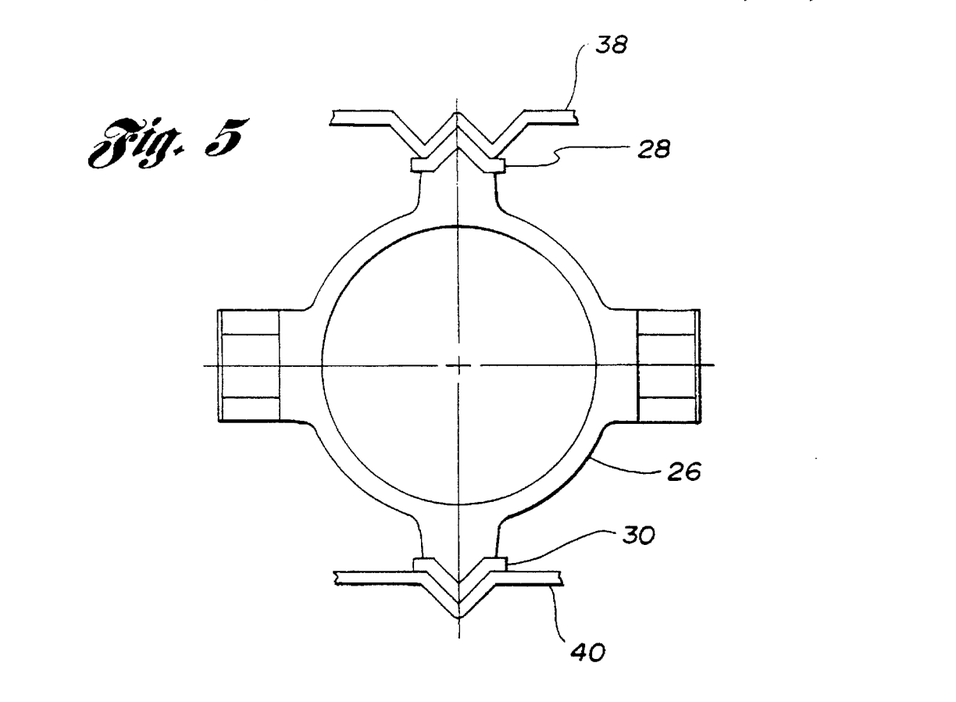
FIG. 5 shows a vertical cross-sectional view of a main housing and telescope housing separated by plastic tracks in accordance with the present invention.

FIG. 5 shows a vertical cross-sectional view of a main housing and telescope housing separated by plastic tracks 28,30. The first plastic track 28 separates the telescope housing 26 from the upper portion 38 of the main housing. The second plastic track 30 separates the telescope housing 26 from the lower portion 40 of the main housing. The upper and lower portions 38,40 of the main housing are allowed to slide with respect to the plastic tracks 28,30.

Figure 6:
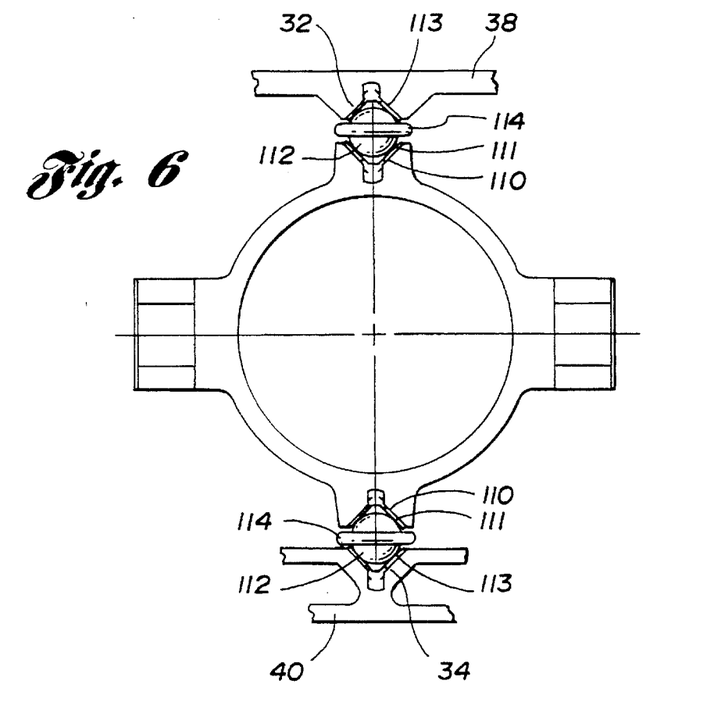
FIG. 6 shows a vertical cross-sectional view of a main housing and telescope housing separated by bearings in accordance with the present invention.

Referring to FIGS. 1b and 6, a further embodiment is provided to replace the plastic tracks 28,30 (as shown in FIG. 5) between the telescope housing 26 and the main housing 12. Referring to FIG. 6, grooves 110 are provided on the telescope housing 26 to receive the steel tracks 111, which are held into position by retainers 122, as shown in FIG. 1b. The steel tracks 113 are connected to the upper and lower portions of the main housing 38,40, and are located in the grooves 32,34. The steel tracks 113 are held into place by retainers 124. Referring back to FIG. 6, ball bearings 112 ride between the steel tracks 111,113. The ball bearings 112 are separated by a plastic separator 114. Tabs (not shown) are provided integrally with the steel tracks and project inwardly therefrom to retain the plastic separator 114 in place. The upper portion 38 of the main housing 12 is screwed to the lower portion 40 of the main housing by means of the support screws 36, and the upper portion 38 is bent to provide a spring preload upon the ball bearings 112. In this configuration, the telescope housing is free to travel in and out with respect to the main housing as the ball bearings 112 travel in the steel tracks 111,113 and the V-grooves 32,34.

OPERATION

In operation, a driver would have access to switches which would control the servomotors for adjusting the steering wheel. When the user wishes to tilt the steering wheel, the switch is moved, which actuates the second servomotor 62. The second servomotor 62 rotates the second hex head 68, which rotates the second cable 64. The second thrust bearing unit 72 supports axial forces upon the cable as the cable rotates. Rotation of the cable 64 causes rotation of the second cable end piece 78, which moves the clevis 80 by means of the threaded connection therewith. The clevis 80 then rotates about the pivot screw 86, thus causing the steering wheel to tilt.

When the user wishes to telescope the steering wheel in or out, another switch is moved which actuates the first servomotor 42. The first servomotor 42 rotates the first cable 46. The first thrust bearing unit 50 supports axial loads upon the first cable 46 as the first cable is rotated. Rotation of the first cable causes rotation of the first cable end piece 58. The first cable end piece is threadedly connected to the telescope actuator 60. Accordingly, when the servomotor rotates the first cable 46, the telescope actuator 60 is caused to move with respect to the cable by means of the threaded connection therewith. Since the telescope actuator 60 is fixedly connected to the telescope housing 26, this movement causes telescoping movement of the telescope housing 26 with respect to the main housing 12. Accordingly, in this manner, a user may selectively telescope the steering wheel in and out.

While the best mode for carrying out the invention has been described in detail, those familiar with the art to which this invention relates will recognize various alternative designs and embodiments for practicing the invention as defined by the following claims.

We claim:

1. A steering apparatus, comprising:

a first portion adapted to be fixed to a vehicle body and having a main housing provided thereon;

a second portion telescopically movable with respect to said main housing, said second portion having first and second ends thereof;

a third portion including a pivot assembly pivotally connecting said third portion with respect to said second portion and adapted to receive a steering wheel thereon;

a pivot actuator operatively connected to said pivot assembly for pivoting said third portion with respect to said second portion;

a telescope actuator operatively connected between said first and second portions for telescoping said second portion with respect to said first portion;

a first motor stationary with respect to said first portion for driving said telescope actuator;

a first driver driven by said first motor;

a first torsionally rigid axially flexible cable having a first end rotatably driven by said first driver and relatively shiftable axially with respect to said first driver and a second end connected to said telescope actuator, such that rotation of said first end of said first cable by said first driver is translated by said first cable to drive said telescope actuator and said first cable is axially flexible as said second portion moves with respect to said first portion;

a second motor stationary with respect to said first portion for driving said pivot actuator;

a second driver driven by said second motor; and a second torsionally rigid axially flexible cable having a first end rotatably driven by said second driver and relatively shiftable axially with respect to said second driver and a second end connected to said pivot actuator, such that rotation of said first end of said second cable by said second driver is translated by said second cable to drive said pivot actuator and said second cable is axially flexible as said second portion moves with respect to said first portion.

2. The steering apparatus of claim 1, further comprising:

an energy absorbing strap operatively connected between said first portion and said second portion for absorbing energy of movement of said second portion with respect to said first portion in a vehicle crash situation.

3. The steering apparatus of claim 1, further comprising:

a rivet connecting said telescope actuator to said first portion, said rivet having shear strength sufficiently low to allow shearing of the rivet in a vehicle crash situation.

4. The steering apparatus of claim 1, further comprising:

a plurality of plastic tracks operatively connected to said second portion and in sliding contact with said first portion to guide movement of said second portion with respect to said first portion.

5. The steering apparatus of claim 1, further comprising:

a plurality of ball bearings operatively positioned between said second portion and said first portion to guide movement of said second portion with respect to said first portion; and a separator positioned between said ball bearings to prevent contact therebetween.

6. A steering column assembly, comprising:

a main housing;

a telescoping assembly, including a telescope housing slidably connected to said main housing, a first motor connected to said main housing, a first torsionally rigid axially flexible cable rotatably driven by said first motor, a telescope actuator operatively connected between said main housing and said telescope housing and driven by said first cable for reciprocating the telescope housing with respect to said main housing;

a tilt assembly, including a tilting head pivotally connected to said telescope housing for carrying a steering wheel, a second motor connected to said main housing, a second torsionally rigid axially flexible cable rotatably driven by said second motor, a tilt actuator operatively connected between said tilting head and said telescope housing and driven by said second cable for tilting the steering wheel with respect to a user; and said axial flexibility of said first and second cables accommodating collapse of said telescoping assembly with respect to said main housing.

7. The steering column assembly of claim 6, wherein said telescope actuator comprising:

a first thrust bearing mounted to said main housing and axially supporting said first cable; and an actuating member threadedly fastened to said first cable and connected to said telescope housing.

8. The steering column assembly of claim 6, wherein said tilt actuator comprises:

a second thrust bearing mounted to said telescope housing and axially supporting said second cable; and a clevis threadedly fastened to said second cable and pivotally connected to said tilting head.

9. The steering column assembly of claim 6, further comprising:

an energy absorbing curl strap operatively connected between said telescope housing and said main housing for absorbing energy of movement of said telescope housing with respect to said main housing in a vehicle crash situation.

10. The steering column assembly of claim 6, further comprising a position sensor for sensing the tilt and telescope position of the steering wheel.

* * * * *